Dec. 29, 1959 A. W. HOLT 2,919,314

MEANS FOR RECORDING AND/OR REPRODUCING
RECORDED HIGH FREQUENCY SIGNALS

Filed Oct. 16, 1956

INVENTOR.
Arthur W. Holt
BY
Johnson and Kline
ATTORNEYS

United States Patent Office 2,919,314

Patented Dec. 29, 1959

2,919,314

MEANS FOR RECORDING AND/OR REPRODUCING RECORDED HIGH FREQUENCY SIGNALS

Arthur W. Holt, Washington, D.C., assignor to The Teletrak Corporation, Wilmington, Del., a corporation of Delaware Application October 16, 1956, Serial No. 616,226

7 Claims. (Cl. 179—100.2)

The present invention relates to a novel means for recording and/or reproducing high frequency signals on a tape and is particularly adapted for storing data and for television or other high frequency recordings.

It is an object of the invention to provide a simple and effective means for recording high frequency signals on a tape without requiring excessive speeds for the tape.

This is accomplished, according to the present invention, by providing a rotating recording or reproducing head within a loop of tape having a surface to receive the recording, with the tape looped so as to position the lines of recording diagonally on the tape.

In the preferred form of the invention the head is mounted in a cylinder and the tape is fed to and wrapped around the cylinder and fed to a receiver therefrom, with the axis of the tape extending obliquely to the axis of the path of movement of the head. The cylinder is run at relatively high speed and the tape is moved longitudinally and at a relatively slow rate of speed, as compared to the surface speed of he cylinder, so that the head moves over the tape through a plurality of juxtaposed parallel paths. Preferably, means are provided for regulating the relative speed between the head and the longitudinal movement of the tape so as to provide uniform or desired spacing of the paths on the tape. Also, means are provided for controlling the guiding of the tape to regulate its lateral position on the drum with respect to the path of movement of the head.

A feature of the invention resides in the fact that the device can be utilized to record and/or reproduce high frequency signals with no substantial changes thereto.

Other features and advantages of the invention will be apparent from the specification and claims when considered in connection with the drawings in which:

Figures 1, 2, 3:
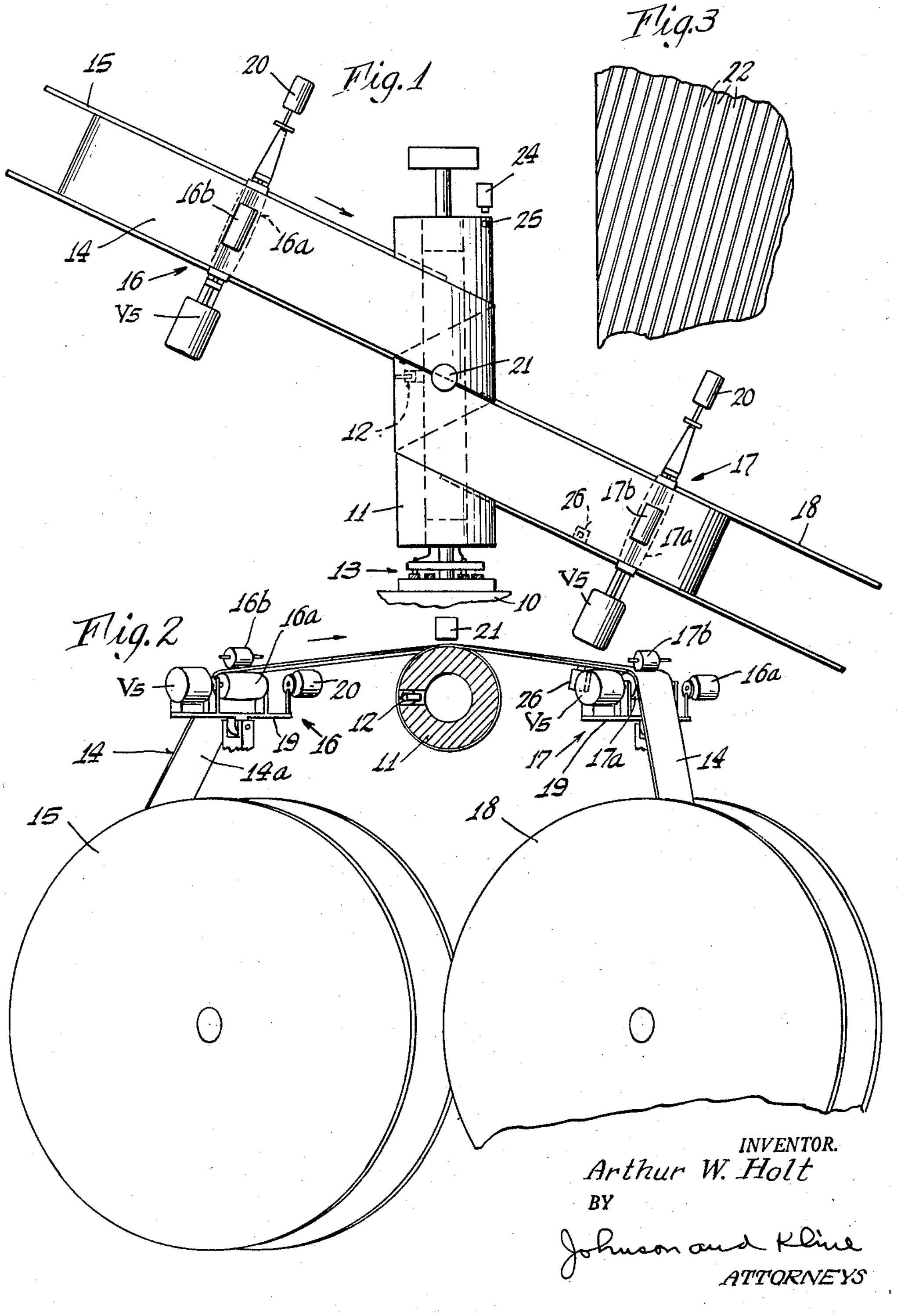
Figure 1 is a top view diagrammatically showing the cylinder and tape relationship.
Fig. 2 is an end view of Fig. 1.
Fig. 3 shows a fragment of the recorded tape showing the diagonal parallel paths.

While the present invention may be employed to record or reproduce recorded high frequency signals, it is herein illustrated as recording such signals. As shown in the drawings, a frame 10 has mounted thereon a cylinder 11 having a head 12, preferably of the magnetic type, positioned substantially flush with its surface. The cylinder is rotated by any suitable means so that the head moves in a predetermined path at a relatively high speed. The head can be connected to any suitable signal pickup such as a microphone or the like means (not shown) by slip rings or brushes 13.

A tape 14 having a surface 14*a* to receive the magnetic recordings from the head is mounted on a supply reel 15 and is led over a driven guiding and feeding means 16 having a driven crowned roller 16*a* and a presser roller 16*b* cooperating therewith, around the cylinder so as to make a wrap around the cylinder of at least 360° but preferably 370° as shown in Fig. 2, over a second feeding and guiding means 17 having a driven crowned roller 17*a* and a presser roller 17*b* cooperating therewith, to the take-up reel 18. The rapid rotation of the cylinder with respect to the tape produces an air bearing therebetween which facilitates the movement of the tape therearound. It will be seen in Fig. 1 that the tape, as it is fed from reel to reel and around the cylinder, has its surface 14*a* facing the cylinder and head and its longitudinal axis disposed obliquely to the axis of the cylinder and to the path of movement of the recording head.

The guiding and feeding means for the tape are driven by variable speed motors V5 and are adapted to move the tape at a slow speed with relation to the speed of the cylinder. It has been found that this can be readily accomplished without any tendency to bind on the rotating cylinder if the tape is maintained at the proper angle with respect to the cylinder. In order to maintain the tape in predetermined angular relation around the cylinder so that its edges are in juxtaposition, which permits the recording to be substantially continuous, each guide means is mounted on a cradle 19 to pivot about an axis perpendicular to the axis of the tape and are adjusted by means of servomotors 20 so that the lateral adjustment of the tape can be readily achieved. The control of the servomotors can be accomplished in many ways. As herein illustrated, a photoelectric means 21, diagrammatically shown in Fig. 2, is provided to overlie the gap formed in the wrap of the tape and to maintain the gap in a predetermined position and at a predetermined value. Deviations of the tape from the predetermined position and gap value will be detected by the photoelectric means and it will control the servomotors for adjusting the guide and feed rollers about the axis of the tape to produce transverse movement of the tape with respect to the cylinder such as will bring the tape into, or maintain it in, its predetermined position about the cylinder.

With the tape obliquely disposed with respect to the path of movement of the head, the head will travel diagonally across the tape and produce a plurality of parallel recorded paths or bands 22 as shown in Fig. 3, the spacing of which is dependent upon the rate of travel of the tape around the cylinder. The diagonally disposed gap between the wraps of tape is kept at a minimum space of several ten thousandths of an inch and extends transversely of the path of movement of the head. This effectively permits the head to ride thereover without substantial loss of signal or danger of the head picking up or being caught in the edge of the tape.

By way of example, the cylinder may be rotated at 3600 r.p.m. and have a circumference of 15.". The tape is 4" wide and is fed along its longitudinal axis at a rate of about 13⅔" per second. The head is a magnetic head having a gap of 0.0001". With this relationship the recording band 22 on the tape is about 0.040" in width with a space of 0.020" between bands. With this relationship up to approximately 4.5 megacycles per second can be recorded.

In order to maintain the proper speed relation between the tape and the recording head so as to provide uniform recordings on the tape, there is provided a monitor means which includes a pickup head 24 mounted adjacent the edge of the cylinder and cooperating with a magnet 25 or other magnetic means on the cylinder for providing a pulse when the cylinder is in a predetermined rotative position. Also provided is a pickup head 26 adjacent the recorded surface of the tape to receive pulses from the tape as it passes thereby. The pulses from the tape and from the cylinder are fed to an electronic comparator circuit and compared in the manner disclosed in the application of James P. Fay, Serial No. 593,919, filed June 26, 1956 and the result of the comparison utilized to control the variable speed motors for the tape to increase or decrease the speed of the feeding means and maintain the predetermined relation between the speed of the recording head and the movement of the tape.

It will be readily apparent that with the present invention by moving a recorded tape from reel 15 to reel 18 and passing it around the cylinder, the rotation of the head will pick up the recorded signal from the tape for reproduction. The controls for maintaining the tape in proper position and for regulating the relationship of the recorded paths to the head to insure pickup of the signal will function the same as during a recording operation.

From the foregoing, it will be seen that I have provided a simple, yet effective means for recording high frequency signals.

Variations and modifications may be made within the scope of the claims and portions of the improvements may be used without others.

I claim:

1. In a device for recording and/or reproducing electrical signals, a cylinder having a magnetic head disposed in the surface thereof, means for rotating said cylinder at a predetermined speed, means for guiding a tape to, around, and away from said cylinder in a path oblique to the axis of the cylinder, means for longitudinally feeding the tape at a speed substantially less than the peripheral speed of the cylinder whereby the head moves diagonally across the tape, said tape having a magnetic record-receiving surface facing said drum, and monitor means responsive to the rotative position of said cylinder and the head carried thereby and the record on said tape for controlling the relative speeds of said tape and cylinder.

2. In a device for recording and/or reproducing electrical signals, a cylinder having a magnetic head disposed in the surface thereof, means for rotating said cylinder at a predetermined speed, means for guiding a tape to, around, and away from said cylinder in a path oblique to the axis of the cylinder, means for longitudinally feeding the tape at a speed substantially less than the peripheral speed of the cylinder whereby the head moves diagonally across the tape in predetermined spaced parallel paths, said tape having a magnetic record-receiving surface facing said drum, and means responsive to the rotative position of said cylinder and the head carried thereby and the record on said tape for controlling the relative speeds of said tape and cylinder to maintain the predetermined spacing of said paths across the tape.

3. In a device for recording and/or reproducing electrical signals, a cylinder having a magnetic head disposed in the surface thereof, means for rotating said cylinder at a predetermined speed, means for guiding a tape to, around, and away from said cylinder in a path oblique to the axis of the cylinder, means, including roller means engaging the tape and driven by variable speed drive means, for longitudinally feeding the tape at a speed substantially less than the peripheral speed of the cylinder whereby the head moves diagonally across the tape, said tape having a magnetic record-receiving surface facing said drum, and means responsive to the rotative position of said cylinder and the head carried thereby and the record on said tape for controlling the variable speed drive means to regulate the relative speeds of said tape and cylinder.

4. In a device for recording and/or reproducing electrical signals, a cylinder having a magnetic head disposed in the surface thereof, means for rotating said cylinder at a predetermined speed, adjustable means for guiding a flat tape to, around, and away from said cylinder in a path oblique to the axis of the cylinder, means for longitudinally feeding the tape at a speed substantially less than the peripheral speed of the cylinder whereby the head moves diagonally across the tape, said tape having a magnetic record-receiving surface facing said drum, and means cooperating with the edge of said tape disposed on the cylinder for controlling the adjustable means for guiding said tape to maintain the tape in proper position on said cylinder and with respect to said head.

5. In a device for recording and/or reproducing electrical signals, a cylinder having a magnetic head disposed in the surface thereof, means for rotating said cylinder at a predetermined speed, means for guiding a tape having a magnetic record-receiving surface to, around, and away from said cylinder in a path oblique to the axis of the cylinder, including roller means engaging said tape and means for adjustably mounting said roller means for movement about an axis passing through the center of said tape, servomotor means connected to the mounting means for said roller means, and means responsive to the position of the tape on said cylinder for controlling the servomotor means for adjusting said roller means to maintain the tape in proper position on said cylinder.

6. In a device for recording and/or reproducing electrical signals, a cylinder having a magnetic head disposed in the surface thereof, means for rotating said cylinder at a predetermined speed, means for guiding a tape to, around, and away from said cylinder in a path oblique to the axis of the cylinder, means for longitudinally feeding the tape at a speed substantially less than the peripheral speed of the cylinder whereby the head moves diagonally across the tape, said tape having a magnetic record-receiving surface facing said drum, means responsive to the rotative position of said cylinder and the head carried thereby and the record on said tape for controlling the relative speeds of said tape and cylinder, and means cooperating with the edge of said tape for controlling the means for guiding said tape to maintain the tape in proper position on said cylinder.

7. In a device for recording and/or reproducing electrical signals, a recording-reproducing head, means moving said head in a circular path about a predetermined axis, means feeding a tape having a record-receiving surface from a supply along a path oblique to said axis and in a helical path around the circular path of movement of the head with the said surface facing the head whereby the head moves diagonally across the tape and forms a record track thereon, means producing a signal in response to a predetermined rotative position of said head, means producing a signal in accordance with the longitudinal movement of the tape, and control means responsive to said signals for controlling the means feeding the tape whereby a predetermined head-track relation is maintained.

References Cited in the file of this patent

UNITED STATES PATENTS

| | | |
|---|---|---|
| 2,203,706 | Stockberger | June 11, 1940 |
| 2,773,120 | Masterson | Dec. 4, 1956 |
| 2,842,617 | Turkheimer | July 8, 1958 |

FOREIGN PATENTS

| | | |
|---|---|---|
| 927,999 | Germany | May 23, 1955 |